Oct. 30, 1951     G. M. BLOOM     2,572,835
WOODEN ROLLER CONSTRUCTION FOR ROLLER SKATES
Filed Oct. 8, 1948
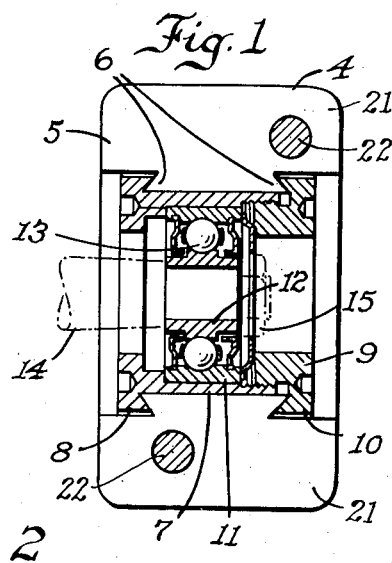
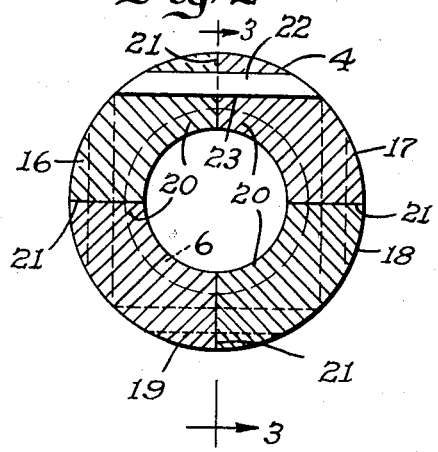 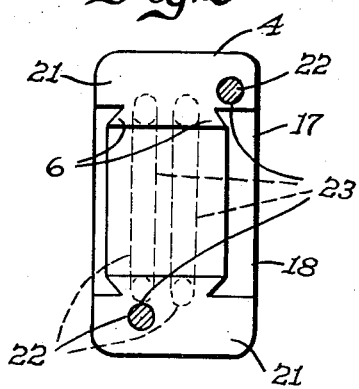
Inventor
George M. Bloom
Andrew F. Wintercorn
Atty Patented Oct. 30, 1951

2,572,835

UNITED STATES PATENT OFFICE 2,572,835

WOODEN ROLLER CONSTRUCTION FOR ROLLER SKATES

George M. Bloom, Rockford, Ill.

Application October 8, 1948, Serial No. 53,391

6 Claims. (Cl. 301—5.7)

This invention relates to a new and improved wooden roller of sectional construction, especially designed and adapted for use on roller skates.

Metal rollers are usually prohibited for indoor skating rinks, because of the extremely smooth and highly polished skating surfaces, and while wooden rollers have generally been preferred, flats soon form on the peripheries when the rollers are of one-piece construction, necessitating frequent truing-up and grinding to obtain the desired smoothness of performance. The frequent truing-up operations soon reduce the diameter of the rollers to a point where they are no longer usable, and it then becomes necessary, of course, to replace the rollers. I have observed that the flats invariably form on diametrically opposed sides, where the wear is on the sides of the grain, very little wear being noticed on the ends of the grain. It is, therefore, the principal object of my invention to provide a sectional roller made up of four ninety degree sections, each of which has the end grain exposed for wear on the periphery, whereby to reduce wear and obtain as even wear as possible throughout the circumference of the roller.

The sections of the four-section roller provided in accordance with my invention are joined together by glued joints, and are also fastened together by wooden dowel pins entered through holes drilled through adjoining sections on chord lines of the circle defined by the roller and in staggered relationship to one another.

The invention is illustrated in the accompanying drawing, in which:

Fig. 1 is a section through a complete roller assembly, on a somewhat enlarged scale, wherein the sectional wooden roller is made in accordance with my invention;

Fig. 2 is a section in a transverse plane through the sectional roller by itself, showing the roller substantially actual size; and Fig. 3 is a cross-section on the line 3—3 of Fig. 2.

The same reference numerals are applied to corresponding parts in these three views.

Referring to Fig. 1, the present invention is concerned entirely with the sectional wooden roller 4, which forms the outer annular tire in the roller assembly for use on smooth highly polished skating surfaces. The bore 5 of the roller 4 is reduced to provide a pair of beveled annular shoulders 6 that are beveled inwardly toward one another. A metal sleeve 7 fits inside the roller, and has an annular flange 8 on one end, beveled to match the cooperating shoulder 6. The other end of the sleeve is internally threaded, to receive the retaining nut 9, on which there is also an annular flange 10 beveled or undercut to fit the other shoulder 6. In the sleeve 13 is housed the precision bearing assembly including an outer race 11, an inner race 12, and a set of anti-friction bearing balls 13 retained in the usual cage and suitably shielded by dirt guards, as shown, the dirt guards serving also to retain the grease with which the bearing assembly is preferably packed. The roller assembly is mounted on the reduced end of an axle 14, that is indicated in dotted lines, there being a nut 15 threaded on the outer end of the axle to fasten the roller in place. No invention is claimed in the roller assembly per se excepting only in so far as the undercut shoulders 8 and 10 on the mounting cooperating with the undercut shoulders 6 of the sectional roller 4 provide a dovetail lock, reducing likelihood of the roller 4 cracking or opening up at one or more of its glued joints, particularly if the sleeve 7 fits a trifle too tightly in the roller bore, the roller sections being all drawn inwardly radially and evenly by the wedging action of the interfitting tapers at 6—8 and 6—10 when the nut 9 is tightened, thereby counteracting whatever internal stresses might be set up in the opposite direction.

In accordance with my invention, the roller 4 is built up of four wedge-shaped blocks of hard maple, these forming ninety degree sections, numbered 16, 17, 18, and 19 in Fig. 2. The grain in each of the ninety degree sections is substantially radial, namely, in the direction of the cross-hatching lines 20 in Fig. 2, so that only the end grain is exposed for wear on the periphery of the roller. The sections are glued together in four radial planes ninety degrees apart by glued joints 21, using, preferably, waterproof glue, and, while the beveled shoulders 6 tying-in with the beveled shoulders on the bearing sleeve 7 and retaining nut 9 might be sufficient to prevent fracturing of the roller at the joints 21, or elsewhere, I, nevertheless, prefer also to fasten the sections together with long wooden dowel pins 22, which are entered through holes 23 drilled through adjoining sections on chord lines of the circle defined by the roller. None of the holes 23 intersect the bore of the roller, and the holes are offset laterally so that there is no intersection therebetween. The dowel pins will also be wetted with glue when pressed into the holes 23, so that there will be no danger of their shifting endwise, and the ends of the pins are flush with the periphery of the roller. The dowels serve not only to reinforce the roller to reduce likelihood of the same opening up at the joints, but also reduces likelihood of the roller cracking.

Wooden rollers of this novel sectional construction are found to far outlast the conventional one-piece wooden rollers and to wear so evenly that much less truing-up and grinding is necessary and far less frequently. The use of four sections 16-19 as compared with the use of say six, or eight, or even sixteen sections, is important because:

(1) Greatest evenness of wear is obtained, there being the maximum area of rolling surface with wooden end grain and the minimum number of glued joints exposed at the periphery; a roller of four sections staying true much longer than one of say eight sections, and one of eight sections staying true much longer than one of say sixteen sections, and so forth, due to the lesser number of glued joints at which unevennesses due to differences in wear will show up;

(2) Less machine and labor expense is involved in working with less parts per roller, and, entirely aside from the matter of the importance in reducing the number of glued joints so as to reduce likelihood of uneven wear, it goes without saying that the more glued joints per roller the greater is the cost for glue and labor and the greater chance of a roller fracturing at one of these glued joints, and (3) Four sections is the minimum number that is practical to use and still obtain the end grain throughout the periphery of the roller for best wearing properties.

It is believed the foregoing description conveys a good understanding of the objects and advantages of my invention. The appended claims have been drawn to cover all legitimate modifications and adaptations.

I claim:

1. A skate roller body having a central bore provided therein, said body being formed of four segmental-shaped ninety degree sections of wood adapted to be secured together in assembled relationship, all of said sections being formed with the grain running lengthwise thereof substantially radially from the center of the roller, whereby to expose only end grain for wear on the periphery of the roller, and wooden dowel pins for connecting together abutting portions of neighboring sections, said pins being entered with a close fit and cemented in holes extending from each section into neighboring sections and provided on lines of chords of the circle defined by the roller, which chords are wholly between the bore and the periphery so that none of the holes intersect said bore, the outer ends of said pins being rounded off flush with the periphery of the roller.

2. A skate roller body having a central bore provided therein, said body being formed of four segmental-shaped ninety degree sections of wood adapted to be secured together in assembled relationship, all of said sections being formed with the grain running lengthwise thereof substantially radially from the center of the roller, whereby to expose only end grain for wear on the periphery of the roller, and wooden dowel pins for connecting together abutting portions of neighboring sections, said pins being entered with a close fit and cemented in holes extending from each section into neighboring sections and provided on lines of chords of the circle defined by the roller, which chords are wholly between the bore and the periphery so that none of the holes intersect said bore, the outer ends of said pins being rounded off flush with the periphery of the roller, the holes being in staggered non-intersecting relationship to one another throughout the roller.

3. In a skate roller construction, the combination of a rotating sleeve member on which a roller body is adapted to be mounted and having an annular shoulder peripherally thereof with an inclined undercut face on the inner side, a roller retaining nut threaded on one end of the sleeve and having an annular shoulder peripherally thereof with an inclined undercut face on the inner side opposed to the first mentioned undercut face on the sleeve, a roller body having a central bore to receive said sleeve, said body being formed of four segmental-shaped ninety degree sections of wood adapted to be secured together in assembled relationship, all of said sections being formed with the grain running lengthwise thereof substantially radially from the center of the roller, whereby to expose only end grain for wear on the periphery of the roller, said roller body being formed with a pair of undercut annular shoulders in the bore thereof matching and abutting the undercut shoulders on the sleeve and nut, whereby to retain the sections against possibility of radial displacement from said sleeve when secured thereon by said nut, there being also wooden dowel pins in said roller body for connecting together abutting portions of neighboring sections, said pins being entered with a close fit and cemented in holes extending from each section into neighboring sections and provided on lines of chords of the circle defined by the roller, which chords are wholly between the bore and the periphery so that none of the holes intersect said bore, the outer ends of said pins being rounded off flush with the periphery of the roller.

4. In a skate roller construction, the combination of a rotating sleeve member on which a roller body is adapted to be mounted and having an annular shoulder peripherally thereof with an inclined undercut face on the inner side, a roller retaining nut threaded on one end of the sleeve and having an annular shoulder peripherally thereof with an inclined undercut face on the inner side opposed to the first mentioned undercut face on the sleeve, a roller body having a central bore to receive said sleeve, said body being formed of four segmental-shaped ninety degree sections of wood adapted to be secured together in assembled relationship, all of said sections being formed with the grain running lengthwise thereof substantially radially from the center of the roller, whereby to expose only end grain for wear on the periphery of the roller, said roller body being formed with a pair of undercut annular shoulders in the bore thereof matching and abutting the undercut shoulders on the sleeves and nut, whereby to retain the sections against possibility of radial displacement from said sleeve when secured thereon by said nut, there being also wooden dowel pins in said roller body for connecting together abutting portions of neighboring sections, said pins being entered with a close fit and cemented in holes extending from each section into neighboring sections and provided on lines of chords of the circle defined by the roller, which chords are wholly between the bore and the periphery so that none of the holes intersect said bore, the outer ends of said pins being rounded off flush with the periphery of the roller, the holes being in staggered non-intersecting relationship to one another throughout the roller.

5. In a roller structure adapted for use with a suitable hub center, four equal sized wedge-shaped blocks of wood arranged radially from said hub and formed with the grain running longitudinally thereof radially from the hub, the converging side faces of said blocks being in abutment around the roller and joined together by four glued joints, the glued together blocks forming a separate roller body mountable on the hub, the roller body having through holes formed therein on lines of chords of the circle defined by the roller, and wooden dowels entered tightly and cemented in said holes for interconnecting adjoining sections at the joints.

6. In a roller structure adapted for use with a suitable hub center, four equal sized wedge-shaped blocks of wood arranged radially from said hub and formed with the grain running longitudinally thereof radially from the hub, the converging side faces of said blocks being in abutment around the roller and joined together by four glued joints, the glued together blocks forming a separate roller body mountable on the hub, the roller body having through holes formed therein on lines of chords of the circle defined by the roller, and wooden dowels entered tightly and cemented in said holes so as to connect adjoining sections at the joints, the ends of the pins being flush with and rounded off on the curvature of the periphery of the roller body.

GEORGE M. BLOOM

REFERENCES CITED

The following references are of record in the file of this patent:

UNITED STATES PATENTS

| Number | Name | Date |
|---|---|---|
| 370,495 | Roy | Sept. 27, 1887 |
| 400,574 | Kehler | Apr. 2, 1889 |
| 527,965 | Gilbert | Oct. 23, 1894 |
| 1,246,324 | Roepke | Nov. 13, 1917 |
| 1,473,085 | Dade | Nov. 6, 1923 |
| 1,500,113 | Dade | July 8, 1924 |
| 2,304,944 | Martinec | Dec. 15, 1942 |